(12) United States Patent
Scheffer (10) Patent No.: US 7,103,950 B1
(45) Date of Patent: Sep. 12, 2006

(54) PIPE BEVELING TOOL AND METHOD

(76) Inventor: Douglas Scheffer, 3201 Oak St., #5, Everett, WA (US) 98201

( * ) Notice: Subject to any disclaimer, the term of this patent is extended or adjusted under 35 U.S.C. 154(b) by 112 days.

(21) Appl. No.: 10/619,016

(22) Filed: Jul. 11, 2003

Related U.S. Application Data (60) Provisional application No. 60/395,483, filed on Jul. 11, 2002.

(51) Int. Cl.
 *B23P 23/00* (2006.01)
 *B23B 5/16* (2006.01)
 *B23C 3/18* (2006.01)
 *B23C 3/04* (2006.01)

(52) U.S. Cl. .................. 29/33 T; 29/27 C; 82/113; 82/101; 30/94; 30/102; 83/54; 451/69; 451/397

(58) Field of Classification Search .......... 29/33 T, 29/27 C, 27 R, 564, 56.5, 33 D, 557; 82/113, 82/101, 128; 30/93, 94, 102; 451/69, 397, 451/398, 413; 409/138, 201, 178, 179; 83/54
See application file for complete search history.

(56) References Cited

U.S. PATENT DOCUMENTS

| | | | |
|---|---|---|---|
| 1,932,462 A | 10/1933 | Howlett | |
| 2,561,484 A | 7/1951 | Shaw et al. | |
| 2,869,239 A | 1/1959 | Jurs et al. | |
| 3,386,337 A | 6/1968 | Spier | |
| 3,431,646 A * | 3/1969 | Young | 30/97 |
| 3,712,174 A | 1/1973 | Granfield | |
| 4,180,358 A | 12/1979 | Uribe | |
| 4,456,045 A * | 6/1984 | Gregoire | 144/373 |
| 4,490,909 A | 1/1985 | Wachs et al. | |
| 4,566,511 A | 1/1986 | Robinson | |
| 4,633,621 A * | 1/1987 | Weber | 451/461 |
| 4,682,919 A | 7/1987 | Mitchell | |
| 4,689,883 A | 9/1987 | Dent | |
| 4,736,545 A | 4/1988 | Moss | |
| 6,079,302 A | 6/2000 | Gudleske | |
| 6,146,067 A | 11/2000 | Owens | |
| 6,938,313 B1 * | 9/2005 | Viola et al. | 29/33 T |

* cited by examiner

*Primary Examiner*—Monica Carter
*Assistant Examiner*—Dana Ross
(74) *Attorney, Agent, or Firm*—Michael F. Hughes; Hughes Law Firm, PLLC (57) ABSTRACT

A tool assembly which is adapted to perform a cutting operation and also a beveling operation on a pipe. There is a rotary power saw which has rotary drive member to which a saw blade can be mounted. There is a bevel section having a mounting member that connects to the rotary drive member, and a bevel member. There is a locating surface portion around the axis of rotation of the bevel member, and an end lateral locating section and an apex end of the bevel member. The bevel section can be removably connected to the drive member of the power saw.

30 Claims, 6 Drawing Sheets

PIPE BEVELING TOOL AND METHOD

CROSS-REFERENCE RELATED APPLICATIONS

The present application claims the benefit of the priority of U.S. Provisional Patent Application 60/395,483, filed Jul. 11, 2002.

BACKGROUND ART

In the prior art, large plastic pipes are used to transport water or other liquids, and these can very substantially in size, with some of these being as large as one to two feet in diameter, or possibly larger. Sometimes they have to be cut to different lengths and joined end to end in some manner, and this often requires beveling the end edge portion of the pipe.

One common method of cutting these pipes is to use a rotary power saw which has a rear hand grip section and a front cutting section. At the cutting section, there is a disc saw blade which is mounted about an axis of rotation that is transversely aligned relative to a forward to rear axis of the power tool. It is common practice in the industry to sometimes bevel the end to edge portion of the pipe by using the saw blade of this same rotary power saw to make the beveled cut around the circumference of the end edge of the pipe section. This is a somewhat difficult task, and is particularly difficult to provide a relatively uniform beveled surface at the proper angle.

A search of the patent literature has disclosed a number of patents, some of which deal with the task of making a beveled cut at the end edge of a pipe or the like. These are the following:

U.S. Pat. No. 6,079,302 (Gudleske) shows a combination tool where the saw blade has bevelling cutters attached to the saw blade, so that the cutting is accomplished simultaneously with the cutting of the pipe.

U.S. Pat. No. 4,736,545 (Moss) shows a machine for tapering fiberglass pipe ends. There is a jig means that holds the pipes and parts in the proper relationship.

U.S. Pat. No. 4,689,883 (Dent) shows a pipe cutting device where there is a saw blade and bevel cutters are mounted to the saw blade.

U.S. Pat. No. 4,682,919 (Mitchell) shows a tool for both cutting and bevelling pipe where there is a rotary cutting blade 38 and a bevel cutter 39 which rotate together. There is an adjustable link assembly which extends around the pipe and this moves around the pipe to make the cut and the bevelling.

U.S. Pat. No. 4,566,511 (Robinson) discloses a sander attachment for a rotary power saw where the power saw is mounted to a support and the sander is attached to the axle of the saw blade.

U.S. Pat. No. 4,490,909 (Waschs, et al.) discloses a "travelling pipe cutter" having a frame and rollers for mounting the frame for travel around the pipe. The saw blade 45 (see FIG. 2) cuts the pipe.

U.S. Pat. No. 4,180,358 (Uribe) shows a power pipe bevel cutting tool. It is indicated that the attachment is capable of being mounted to a variety of power tools. There are rollers provided for guiding the bevelling tool around the pipe.

U.S. Pat. No. 3,712,174 (Gransfield) shows a jig that holds the power tool by which the bevel cutter is rotated relative to the pipe.

U.S. Pat. No. 3,386,337 (Spier) shows a bevel cutter on which the rotating tool is guided by a means which is centered within the pipe.

U.S. Pat. No. 2,869,239 (Howard) shows an abrading disk driven by a power device that resembles a power saw. The edge of the disk 19 forms the bevel abrading the edge of the pipe. There is a means for mounting the abrading device around a spindle 5 that is centrally mounted with respect to the pipe.

U.S. Pat. No. 2,561,484 (Shaw, et al.) shows a power operated cutting tool that is mounted to the pipe in a manner so that it will travel around the pipe. In FIG. 2, there is shown a cutting tool 72 which would appear to have a cutting edge that would both cut through the pipe and create a bevel.

U.S. Pat. No. 1,932,462 (Howlett) discloses a pipe cutting machine having a rotary saw.

DESCRIPTION OF THE EMBODIMENTS OF THE PRESENT INVENTION

The method and apparatus of the embodiments of the present invention are able to accomplish the cutting of a pipe or the like, and also beveling an end portion of the same. A first embodiment comprises a rotary power saw section and also a bevel section.

The rotary section comprises a rear handle grip portion which is adapted to be manually grasped, and a forward saw portion having a saw mounting portion with a rotary drive member to which a rotary blade can be mounted. The rotary drive member has a transverse axis of rotation. In a configuration of the first embodiment, the rotary power saw section can be considered as having a front end, a rear end, and a front-to-rear longitudinal axis, with the transverse axis of rotation having a substantial alignment component perpendicular to the longitudinal axis.

The bevel section comprises a mounting portion and a bevel cutting portion. The mounting section is arranged to be connected to the rotary drive member so as to be rotatable therewith, and the bevel cutting section is connected to the mounting section so as to be rotatable therewith. The bevel section further comprises a bevel member adapted to be located in an operating position to bevel a pipe end portion.

The bevel cutting section has a locating surface portion rotatable with the bevel section. This locating surface is located adjacent to the bevel member, and in its operating position it engages the pipe end edge portion to locate the bevel section.

The bevel cutting section comprises a locating member having an edge portion which comprises the positioning surface which extends around the axis of rotation of the bevel member and is positioned radially outwardly of the bevel member.

The bevel member and the locating member can be adjustably moveable relative to one another along the axis of rotation of the bevel member. The locating member comprises a sidewall which defines a recess in which to receive the bevel member. Also, the locating member may be adjustably mounted to the mounting section, so as to be able to be positioned at different locations along the axis of rotation of the bevel member. Also, the locating member may threadedly engage the mounting member. Further, the bevel member may connect to the mounting section so that the relative locations of the bevel member and the locating member can be modified by adjustably moving the locating member relative to the mounting section.

The bevel member in one form has a threaded connection portion that connects to a threaded socket in the drive member. In another form, the mounting section has a collet connecting portion to engage the bevel member.

The bevel member has a slanting cone-shaped cutting surface, with a larger diameter base end portion and an apex end portion. The bevel member in one form has adjacent its apex end a lateral positioning member which has a surrounding positioning surface to engage a sidewall of the pipe on which the beveling operation is being performed.

One configuration of the bevel section is such that the mounting section has a threaded end connection adapted to engage the rotary drive member, so as to be rotatable therewith. Also, there is an intermediate threaded portion having a first end portion connected to the threaded end connector and a bevel end connecting portion connected to the intermediate threaded portion.

Also in this configuration, there is a bevel cutting section comprising the bevel member having a bevel connecting member portion arranged to be connected to the bevel end connecting portion of the mounting section.

In an embodiment of a method of the present invention, there is provided the rotary power saw section and the bevel section as described above. The mounting section of the bevel section is connected to the rotary drive member, and the power saw is positioned so that the bevel member is adjacent to the end edge portion of the pipe. The locating surface is positioned against the end edge portion of the pipe.

The rotary power saw is operated to rotate the drive member and thus rotate the bevel member. The rotary power saw is moved so that the bevel section moves around the end edge portion of the pipe to form to form the bevel surface with the locating surface portion engaging the end edge portion to properly locate the bevel member. Further, there may also be the lateral positioning member to engage the sidewall of the pipe during the cutting operation.

Figures 1, 2:
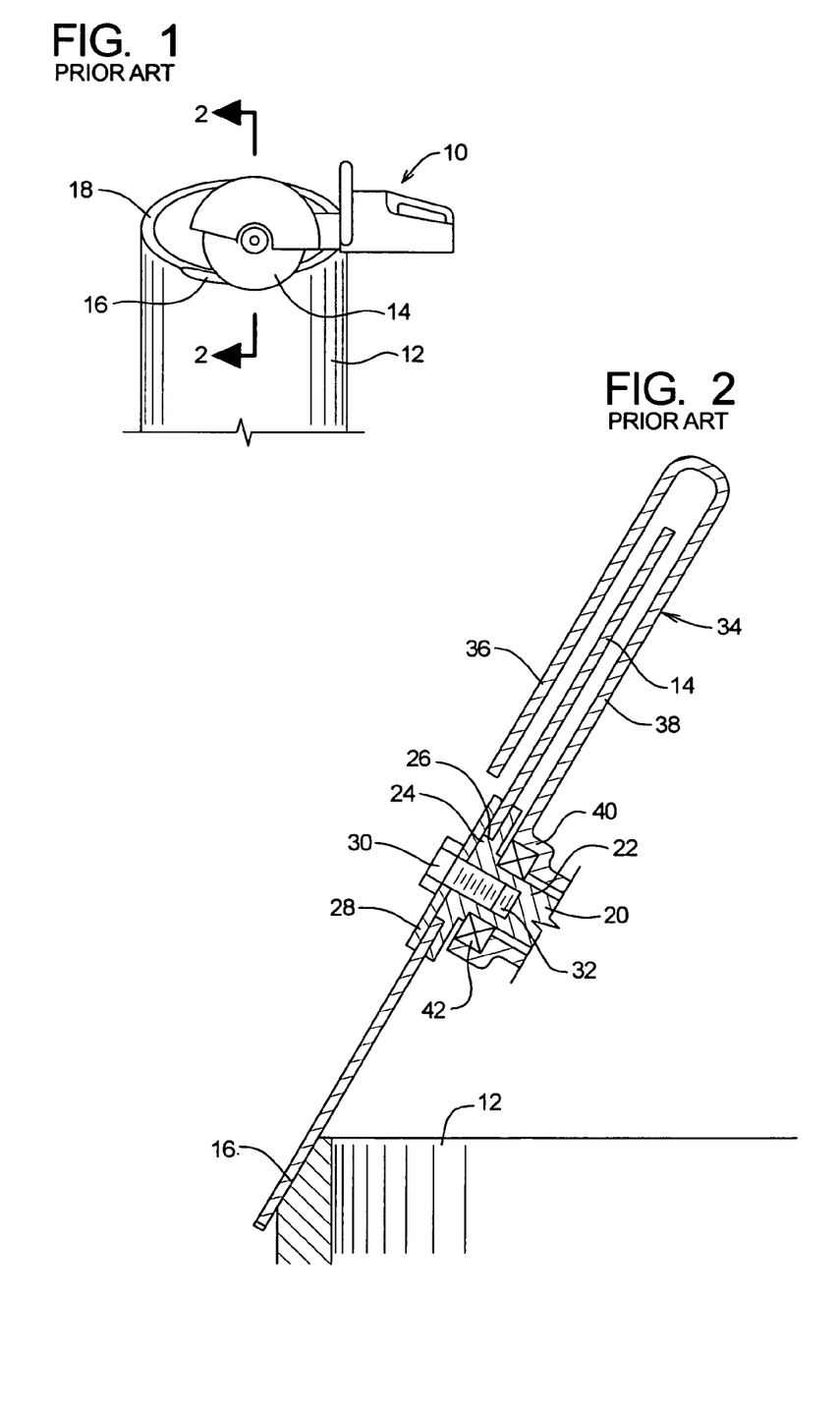
FIG. 1 is an isometric view showing a prior art rotary power saw beveling the edge of a plastic pipe.
FIG. 2 is a sectional view taken along line 2—2 of FIG. 1, showing the disc saw blade of the cutting tool of FIG. 1 cutting a bevel into the end edge portion of the pipe.

It is believed that a clearer understanding of the present invention will be obtained by first describing, with reference to FIGS. 1 and 2, a common prior art method of making a beveled cut in the end edge portion of a plastic pipe or the like, and then describing in detail the embodiments of the present invention.

With reference to FIG. 1, the prior art method is shown where there is a prior art rotary power saw 10 which is positioned to perform a beveling operation on a section of a pipe 12. The power saw 10 has a disc-shaped saw blade 14 making a bevel cut 16 on the outside of an end edge portion 18 of the pipe 12.

FIG. 2 is a cross-sectional view of FIG. 1 showing the manner in which the saw blade 14 is mounted to the power saw 10. The power saw 10 has a transversely extending drive shaft 20 with a blade mounting portion 22 that comprises a hub 24 having an annular recess 26. The central opening of the saw blade 14 fits in the annular recess 26 so as to center the saw blade, and a washer 28 bears against the adjacent surface of the inner portion of the saw blade 14. A bolt 30 is inserted into a threaded socket 32 formed in the outer end of the drive shaft 20, and this presses the inside circumference portion of the saw blade 14 against the outer portions of the hub 24 so as to secure the saw blade 14 to the drive shaft 20.

There is a guard member 34 which fits over the upper half of the saw blade 14. The guard member 34 comprises a pair of generally semi-circular shaped plates 36 and 38 positioned on opposite sides of the upper portion of the saw blade 14, and joined together at their curved outer edge portions. The inner portion of the plate 38 is formed integrally with a mounting portion 40 that extends around the drive shaft 20. There is a bearing member 42 which is positioned around the shaft 20, with this bearing member 42 engaging the guard member mounting portion 40 to properly locate the guard member 34 relative to the shaft 20, and to enable the shaft 20 to freely rotate.

Thus, it can be seen that the prior art method, shown in FIG. 1, is using the same rotary power saw 10 that is used in cutting through the entire circumference of the pipe 12 to saw off a section of the pipe 12. The pipe 12 is positioned (vertically as shown in FIG. 1) so that the end edge 18 is located so that it is accessible to being cut in the manner shown in FIG. 1. More specifically, the handles of the power saw 10 are grasped and the power saw 10 is operated in an angled position so that the saw blade 14 makes the beveled cut around the outer edge of the end edge portion 18 of the pipe 12.

With the foregoing description of one prior art method of making the bevel 16 on the pipe 12 (as seen in FIGS. 1 and 2) being completed, there will now be a description of the first embodiment of the present invention. There will first be a general description of the overall configuration of the present invention and its operation, and this will be done with reference to FIGS. 3 and 4. After that is completed, then there will be a more detailed description of the components and features of this first embodiment of the present invention.

Figure 3:
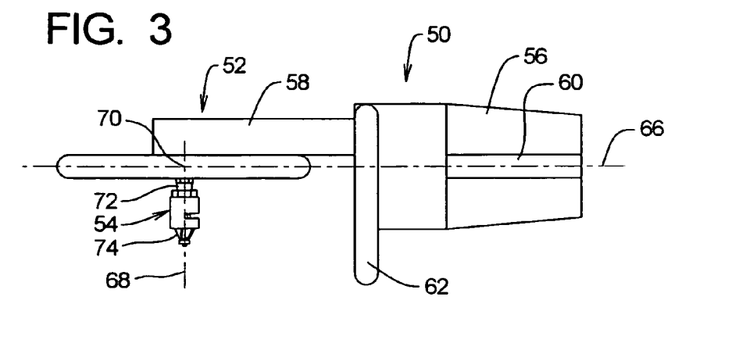
FIG. 3 is side elevational view showing the tool assembly of the present invention performing a beveling operation around the outside of the end edge portion of a pipe.
Figures 4, 5:
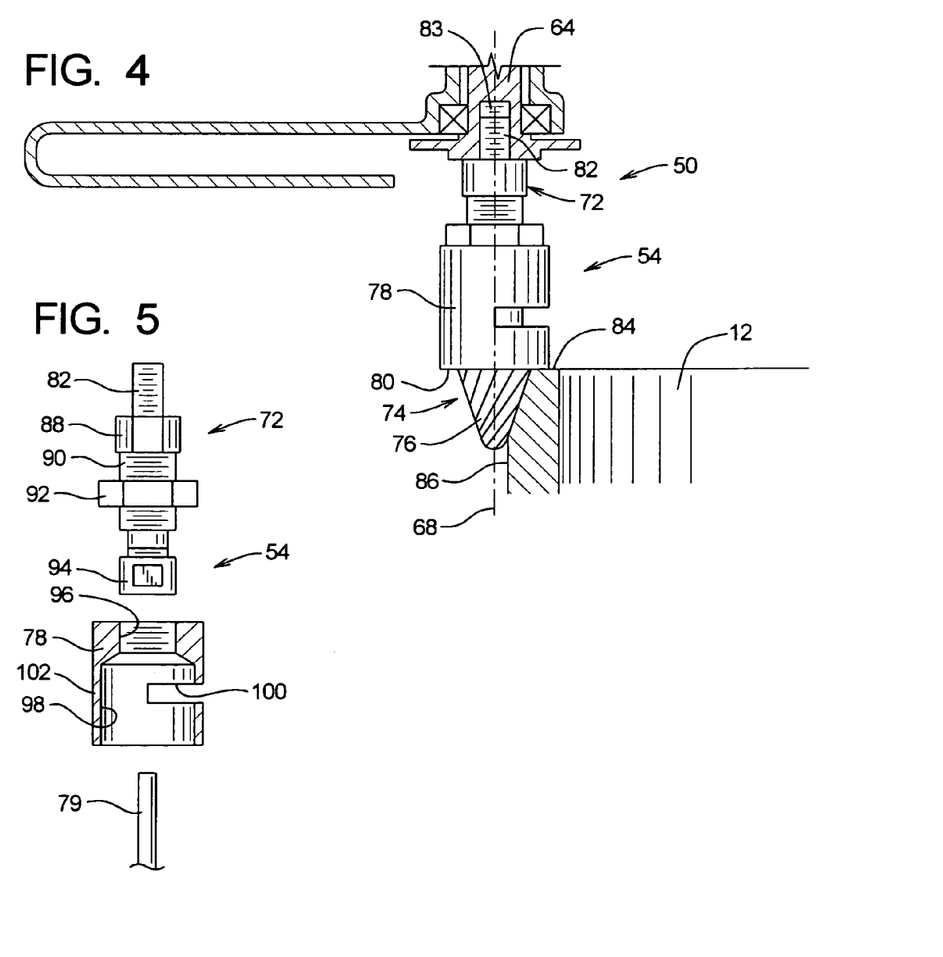
FIG. 4 is a cross-sectional view, partly in section, similar to FIG. 3, but drawn to an enlarged scale, showing the bevel section of the tool assembly of the present invention performing the beveling operation.
FIG. 5 is an exploded cross-sectional view partly in section, showing the mounting section and the locating portion of the beveling portion of the bevel section.
Figure 6:
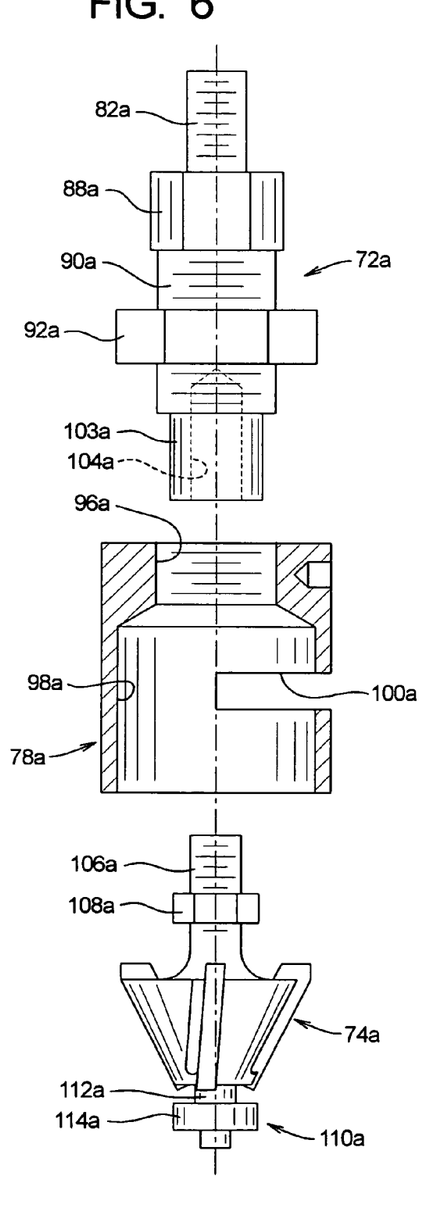
FIG. 6 is an exploded cross-sectional view similar to FIG. 5, showing the bevel section of the second embodiment of the present invention.
Figure 7:
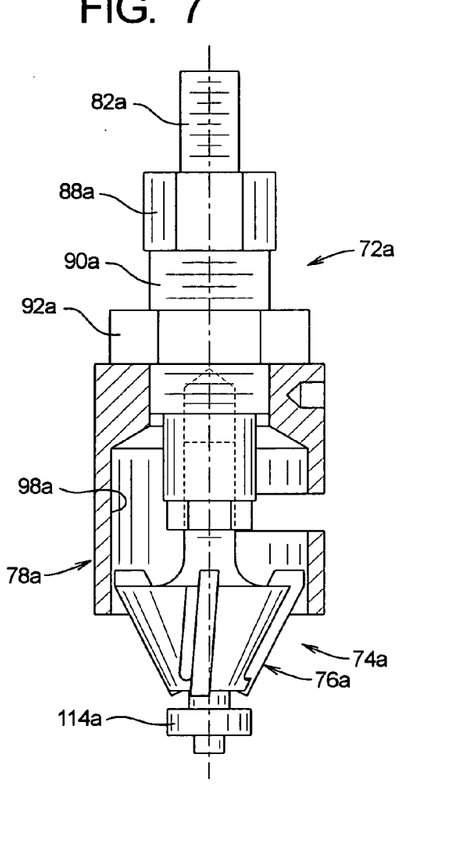
FIG. 7 is a cross-sectional view of the components of FIG. 6 in their assembled operating condition.
Figure 8:
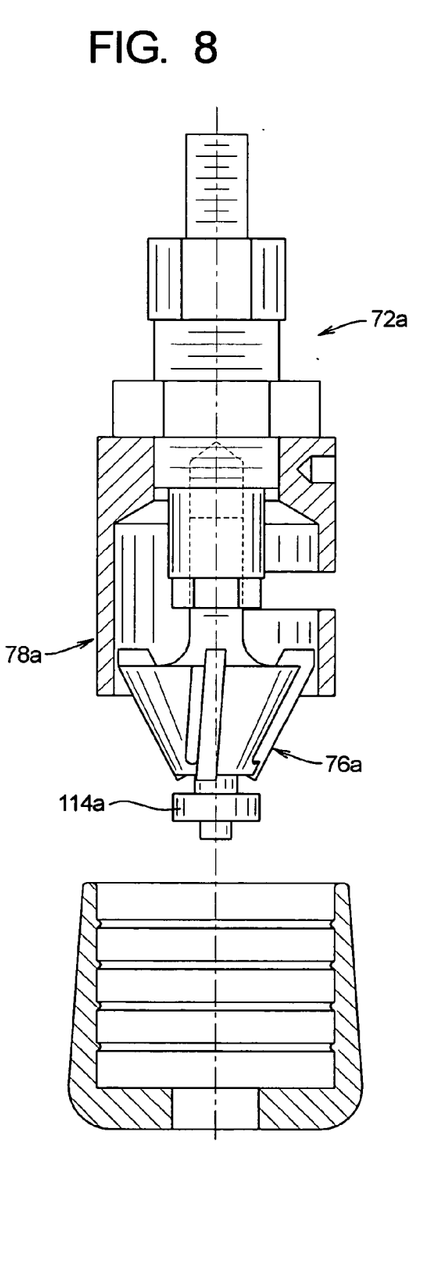
FIG. 8 is a view the same as FIG. 7, except there is also shown a cover cap in a location removed from the beveling section.
Figure 9:
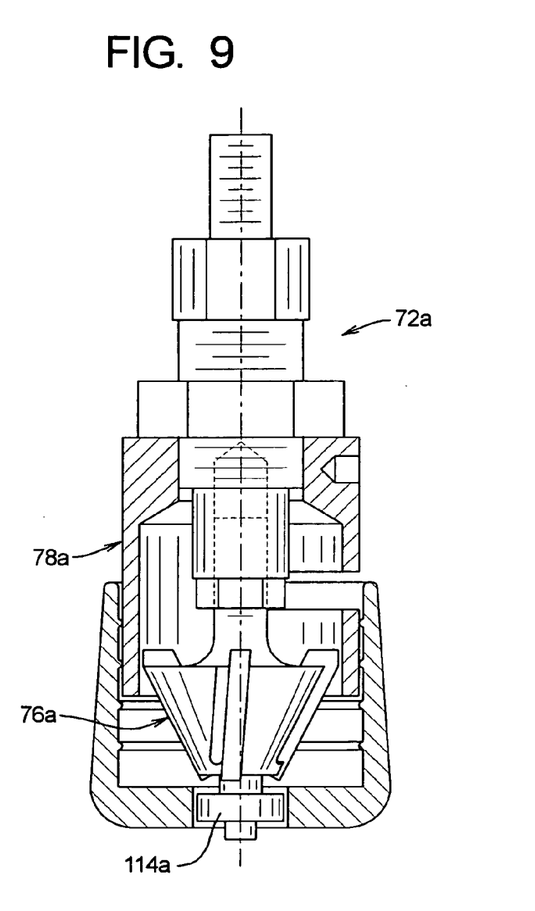
FIG. 9 is a view similar to FIG. 8, but showing the end cover cap in its covering position over the beveling tool.

The tool assembly 50 of the present invention comprises a rotary output power section 52 and a bevel section 54. As indicated previously in this text, in the two embodiments of the present invention, described and shown herein, an existing prior art rotary power saw can be used as the rotary power output section 52 with little or no modification to the rotary power saw. This will be described more fully later herein.

In describing the tool assembly 50, since some of the components of the rotary output power section 52 are, or may be, identical (or substantially similar) to corresponding components in the prior art rotary power saw 10. In describing these components as they appear in the tool assembly 50 of the present invention, numerical designations differing from the corresponding components in the prior art power saw 10 will be given to those components that appear in the tool assembly 50. This is done so that there is not confusion in determining whether reference is being made to a certain component as it appears in the prior art power saw 10 or in the power tool assembly 50 of the present invention.

The power section 50 comprises a rear hand grip portion 56 and a forward drive section 58. The handle grip portion 56 comprises a rear operating handle 60 and a forward stabilizing handle 62. This hand grip arrangement is typical of those that can be found in a number of hand-held power tools such as chainsaws, the rotary power saw 10 (described above), etc. There is a drive shaft 64 (see FIG. 4) positioned in the drive section 58, and this drive shaft 64 is or may be the very same drive shaft 20 shown in FIG. 2 in the rotary power saw.

The rotary output power section 52 can be considered as having a longitudinal axis 66, extending in a rear to forward direction through the hand grip section 56 and through the drive section 58 at the location of the center of rotation of the drive shaft 64, a transverse axis 68 which is concentric with a center of rotation of the drive shaft 64 and transverse to the longitudinal axis 66, and a vertical axis 70 perpendicular to the both the longitudinal axis and the transverse axis.

The beveling section 54 is shown in its operating position in FIG. 4, and this comprises a mounting section 72 by which the beveling section 54 is connected to the drive shaft 64, and a bevel cutting section 74 connected to the mounting section 72 so as to be rotatable therewith.

The bevel cutting section 74 further comprises a bevel member 76 which performs the actual bevel cutting operation, and a locating member 78 that provides a locating surface 80 that properly positions the bevel member 76 relative to the end edge 18 of the pipe on which the beveling operation is being performed. The bevel member 76 is fixedly connected at its upper center portion to a shaft 79 by which the bevel member 76 connects to the lower end of the lower end of the mounting section 74. For ease of illustration, the shaft 79 is not shown in FIG. 4, but is shown in the exploded view of FIG. 5.

This description of the tool assembly 50 given thus far describing the components 52 through 80 is given as a general overview of the tool assembly 50, and the operation of the tool assembly 50 will now be described with reference to FIGS. 2, 3, and 4.

In the following description, the terms "upper" and "lower" shall refer to the orientation of the tool assembly 50 and the pipe 12 as seen in FIG. 2. The terms "inward" and "outer" shall refer to a direction toward or a direction away from, respectively, the longitudinal center axis of the pipe 12. Also, the terms "inner" and "outer" shall denote locations nearer to or further from, respectively, the longitudinal center axis of the pipe 12. On the assumption that the rotary output power section 52 of the tool assembly 50 of the present invention is basically the same as the prior art rotary power saw 10 shown in FIGS. 1 and 2, there will now be a description of the manner in which the rotary power saw 12 is adapted to function as the rotary power section 52 of the tool assembly of this first embodiment of the present invention. This is accomplished by removing the retaining bolt 30 shown in FIG. 2, and then connecting the bevel section 54 to the shaft 20 of the rotary power saw 10 by means of a threaded end connector 82 of the mounting section 72 which is inserted into the existing threaded socket 83 in the end of the drive shaft 64. As shown in FIG. 4, the saw blade 14 and the washer 28 have also been removed. As another option, the blade 14 and/or the washer 28 can remain in place, and when the bevel section 54 is in place, as shown in FIG. 4, the bevel section 54 would simply press against the washer 28 or directly against the blade 14 to hold the blade 14 in its normal position in the rotary power saw 10.

To describe now the operation of the tool assembly 50, with the pipe 12 being vertically aligned, the tool assembly 50 is positioned so that the transverse axis 68 of the tool assembly is vertically aligned so as to be parallel to the longitudinal center line of the pipe 12.

To cut the bevel 16 in the end to edge portion 38 of the pipe 12, the tool assembly 50 is positioned as shown in FIG. 4, with the locating surface 80 of the locating member 78 resting on the transverse edge surface 84 (shown as an "upper" surface in the orientation of FIG. 4) with the bevel member 76 positioned adjacent to the outer circumferential side surface 86.

Then, when the rotary output power section 52 is operated to cause rotation of the drive shaft 64, the bevel member 76 is moved around the upper circumferential edge 84 of the pipe 12 to cut the beveled surface 16.

With the immediately preceding text giving a general overview of the structure and functioning of this first embodiment of the present invention, there will now be a more detailed description of various components of the first embodiment and features of the same.

Reference is first made to FIG. 5, which is an exploded view of the mounting section 72 and also of the locating member 78 of the bevel cutting section 74. The mounting section 72 comprises the aforementioned threaded end connector 82 which is at the upper end of the mounting section 72. Immediately below the threaded end connection, there is a flat sided portion 88, which in this configuration has in transverse section two diametrically opposed flat surfaces and which is, or may be, formed integrally with the end connector 82. Connected to and extending downwardly from the flat sided portion 88 is a second intermediate cylindrical threaded portion 90, and a lock nut 92 threadedly engages the threaded portion 90 so as to be able to be rotated and moved upwardly and downwardly on the immediate threaded portion 90.

Below the intermediate threaded portion 90 is a collet member 94 which is fixedly connected to the mounting section 80. The threaded end connector 82, the flat sided portion 88, the intermediate threaded portion 90, and possibly a stationary portion of the collet member 94 are, or may be, made as a single integral piece or could be made as separate components joined to one another. This collet member 94 receives the shaft 79 which is rigidly connected to the upper center portion of the bevel member 76. The flat sided portion 88 can be conveniently gripped with a wrench or some other tool so that the mounting section 72 can be rotated to cause the threaded end connector 82 to be securely connected into the threaded socket 83 formed in the end of the shaft 64. The intermediate threaded portion 90 serves the function of permitting the nut 92 to be threaded for upward and downward positioning, so that the nut 92 serves as a lock nut for the locating member 78. Further, this intermediate threaded section 90 provides a means for adjustable connecting to the locating member 78.

The aforementioned locating member 78 has, or may have, a generally cylindrical configuration, and has at its upper end a threaded opening 96 which is sized to threadedly engage the threads of the intermediate threaded portion 90 of the mounting section 72. Immediately below the threaded opening 96 there is a cylindrical chamber or receptacle 98 which has a diameter slightly larger than the diameter of the widest portion of the bevel member 76. Thus, the upper portion of the bevel member 76 can be moved upwardly into the chamber 98, and this configuration is shown in FIG. 4.

There is a slot-like opening 100 which is formed in the side wall 102 which is at the lower part of the locating member 78. This slot-like opening 100 is formed in approximately semi-circle and is dimensioned so that a tool can be inserted through the opening 100 to tighten or loosen the collet member 94. In the lower part of the exploded view of FIG. 5, there is shown an upper portion of the bevel member connecting shaft 79 which connects to the upper end of the bevel member 76. This connecting shaft 79 extends into the collet member 94 where it can be secured by the collet member 94 so as to properly position the bevel member 76 in the bevel section 54.

The bevel member 76 is, or may be, conventional in and of itself, and as shown herein the bevel member 76 has a cone-shaped configuration with the base of the cone connecting to the aforementioned connecting shaft 79.

To explain now the manner in which the bevel section 54 is assembled and placed in its operating position, the bevel section 54 is assembled by connecting the locating member 78 to the mounting section 72. This is accomplished by causing the threaded opening 96 of the locating member 78 to be threaded onto the lower part of the intermediate threaded portion 90 of the mounting section 72. When this is accomplished, then the lock nut 79 can be rotated downwardly into engagement with the upper surface of the locating member 72 to keep it in the desired position. The bevel member 76 is placed in its assembled position by inserting the connecting shaft 79 of the bevel member 76 into the collet member 94, and then tightening the collet member 64 to grip the connecting shaft 79 by placing the proper tool into the slot 100 to engage the collet member 94, and cause the collet member 94 to go into its locking position.

With the bevel section 54 thus assembled, the bevel section 52 is then connected by means of its threaded end connector 82 into the recess 83 of the drive shaft 64 of the rotary output power section 52. As indicated previously in this text, on the assumption that the rotary output power section is the same as, or similar to, the prior art rotary power saw 10, the bolt 30 of the rotary power saw 10 is unthreaded from its matching socket, and the washer 28 and/or the saw blade 14 may be removed or left in place. In either case, the threaded end connector 82 is threaded into engagement in the socket 83 so that the bevel section 54 is tightly engaged with the shaft 64. A wrench can be applied to the flat sided portion 88 to apply sufficient torque to ensure proper engagement. Then, the tool assembly 50 can be operated in the manner as described above with reference to FIGS. 3 and 4.

It is to be understood that the various terms that are used in describing this first embodiment, as well as the items in the description that follows relative to the second embodiment, are not to be interpreted so as to limit the scope of the claims to the literal definition of those terms. For example, a certain component or a member may be given a singular designation, but it quite possibly may well be within the broader scope that any single member or component could be made as a plurality of such members or components, and not be outside the scope of the present invention. Further, it could be that one or more members or components that are described in the text of this application could be combined into one component or member, instead of having these as separate components or members. For example, for efficiency and the economy of the manufacturing process, it may be designed to make a particular component into two parts which are joined together in an assembly, instead of being made as an integral part. Also, the relative positions, mode of attachments, mode of engagements or other functions are described to disclose to the reader how these are arranged in these embodiments and are not necessarily to be interpreted that these are the only configurations and arrangements, and are not necessarily to be interpreted that these are the only configurations, locations, relative dimensions, etc. For example, there could be a socket member could have a male member of a fitting, or a different joining method may be used. Further, such components as a locating or bearing member that perform a function or other components which performs a certain function could have the function accomplished by some other component bearing a quite different name but yet might serve the same functional relationship (or a very similar functional relationship), and be within the broader scope of the present invention, these terms should be so interpreted. For example, there could be a plug and socket connection where one member has the plug and the other has the socket, and there could be a reversal of parts as to which component is on which member. Also, different connecting means could quite possibly be used.

A second embodiment of the present invention shows FIGS. 6–9. Components of the second embodiment which are the same as, or similar to, components of the first embodiment will be given like numerical designations, with an "a" suffix distinguishing those of this second embodiment.

This second embodiment of the present invention is a tool assembly 50, and has the two basic sections as in the first embodiment, namely a rotary output power section 52 and a bevel section 54. The rotary output power section 52 of this second embodiment is, or may be, exactly the same as in the first embodiment, or at least similar thereto. Accordingly, this rotary output power section of the second embodiment is not shown in FIGS. 6–9.

This bevel section 54a of the second embodiment differs in some respects from the bevel section 54 of the first embodiment. It comprises a mounting section 72a and a bevel cutting section 74. The mounting section 72a has a threaded end connector 82a, the flat sided portion 88a, the intermediate threaded portion 90*a*, and the lock nut 92*a*. However, instead of having a lower collet, as shown at 94 in FIG. 5 of the first embodiment, there is a bevel connecting member 103*a* which is made integrally with or otherwise connected to, the intermediate threaded portion 90*a*, and which has a downwardly facing cylindrical threaded recess 104*a*.

The locating member 78*a* has the same configuration as the locating member 78 of the first embodiment. However, there could be modifications in the configuration to adapt this locating member 78*a* to this particular design of the second embodiment, such as changing dimensions, etc.

The bevel member 76*a* has, or may have, the same or similar configuration as the bevel member 76 of the first embodiment. However, instead of having the unthreaded connecting shaft 79 that connects to the collet member 94, the bevel member 76*a* has a threaded cylindrical connecting member 106*a* which is sized to fit in the socket 104*a* of the connecting member 94*a* of the mounting section 72*a*. Thus, the connection of the bevel member 76*a* to the connector 94*a* is by means of a threaded connection where the threaded connector 106*a* is threaded into the socket 104*a*. Further, a lock nut 108*a* is threaded onto the connector 94*a*. Thus, when the connector 94*a* is threaded into the socket 106*a* the proper distance, the lock nut 108*a* can be threaded up into firm engagement with the connector 104*a* to securely hold the bevel member 76*a* in place. This can be accomplished by inserting a tool through the slot-like opening which is shown at 100*a*.

A further feature of the second embodiment is that at the lower end of the bevel member 76*a* there is a downwardly extending lateral positioning portion 110*a*, which comprises a downwardly extending finger 112*a* on which is mounted a roller bearing 114*a* having a cylindrical positioning surface. This roller bearing 114*a* engages the side surface 86 of the pipe 12 for lateral positioning of the bevel member 76.

To describe now the functional relationships of the second embodiment, the locating member 78*a* is threaded onto the intermediate threaded portion 90*a* the desired distance, and then the lock nut 92*a* is rotated into firm engagement with the upper surface of the locating member 78*a* to hold it securely in place. Then, the bevel member 76*a* is threaded into the socket 106*a*, a desired distance, and then the lock nut 108*a* locks the connector 94*a* into the socket 106*a*, thus fixing the vertical position of the bevel member 76*a*.

Thus, the relative positions of the bevel member 76*a* and the locating member 78*a* can be controlled so that the locating surface 80*a* can be positioned to be a predetermined distance relative to the bottom end of the bevel member 76*a*. Also, the lateral positioning of the bevel member 76*a* relative to the outside surface of the pipe 16 is established by the outer surface of the bearing member 114*a*. The combination of the positioning of the locating surface 80*a* and the surface of the bearing 114*a* determines the vertical dimension of the bevel 16 relative to the locating member 78, and establishes the vertical and lateral dimension of the bevel cut 16 into the upper end portion of the pipe 12.

Figure 10:
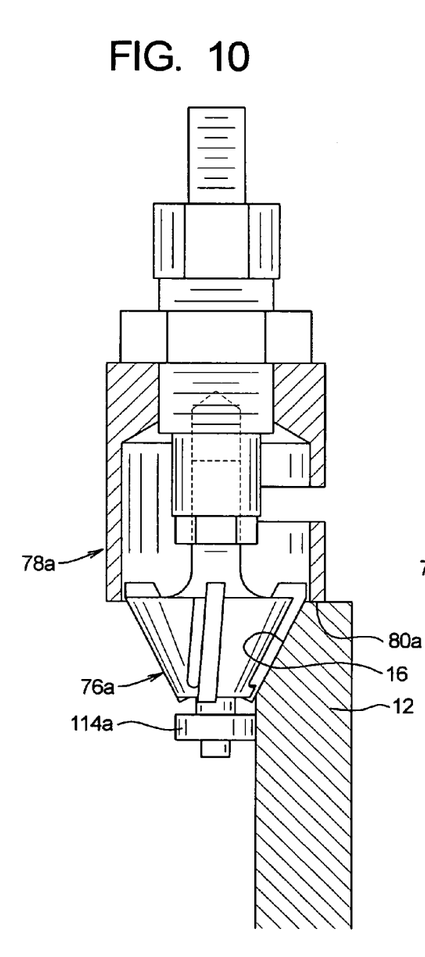
FIGS. 10 and 11 are cross-sectional views similar to FIG. 7, with portions of components within the locating member being omitted for purposes of illustration, and with FIG. 10 showing the operating position of the bevel member in a lower position, and FIG. 11 showing the bevel member in a higher location to accomplish bevel cuts of different size.
Figure 11:
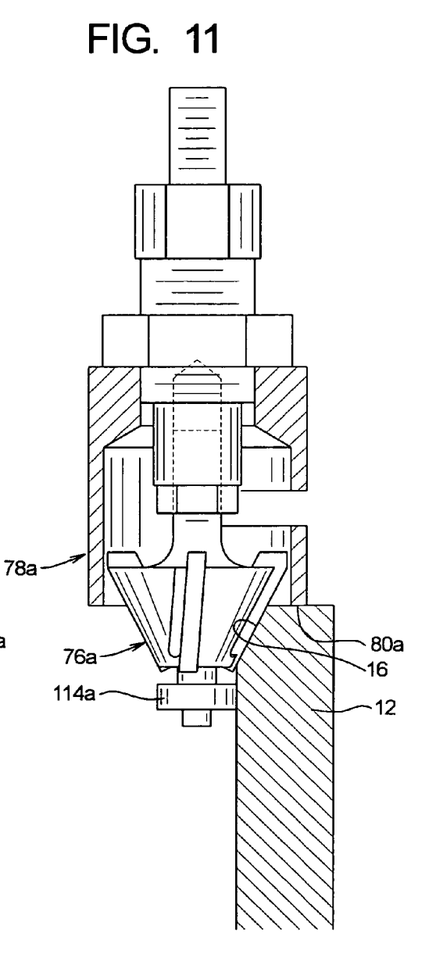
Figure 12:
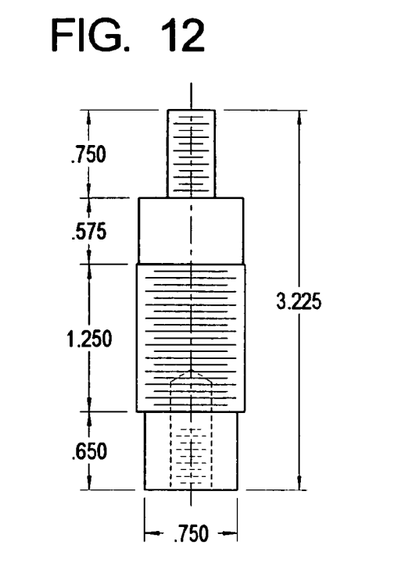
FIG. 12 is a sectional view of the mounting portion of the bevel section of the second embodiment showing various dimensions.
Figure 13:
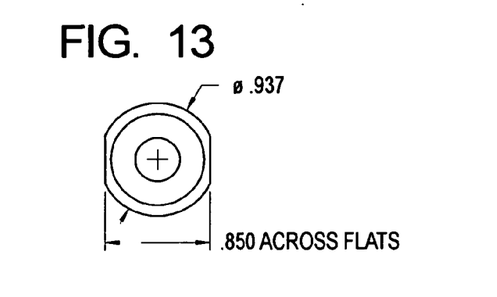
FIG. 13 is a top plan view of FIG. 12.
Figure 14:
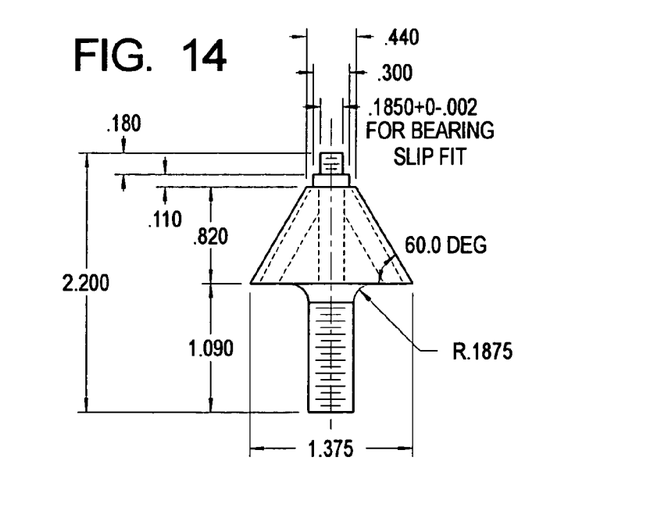
FIG. 14 is a somewhat schematic view of the bevel member of the second embodiment giving various dimensions.

This feature is illustrated in FIGS. 10 and 11. For ease of illustration, the components within the chamber of the locating member 78*a* are omitted from the drawings of FIGS. 10 and 11. In FIG. 10, the collet member 76*a* is at a lower position, and it can be seen that the bevel 16 being cut is further into the width of the pipe 12, and also has a greater vertical distance. On the other hand, in FIG. 11, the collet member 76*a* is at a higher position, and thus the bevel cut 16 is smaller in both its lateral and vertical dimensions.

It is to be understood that various modifications could be made to the embodiments described herein, and that these could well be within the scope of the claims which follow this text.

I claim:

1. A tool assembly for cutting a pipe and beveling a pipe end edge portion of the pipe, said tool assembly comprising:
   a) a rotary power saw section comprising:
      i) a rear handle grip portion which is adapted to be manually grasped, and
      ii) a forward saw portion having a saw mounting portion with a rotary drive member to which a rotary saw blade can be mounted, said rotary drive member having a transverse axis of rotation about a center axis of rotation of the rotary drive member,
   b) a bevel section comprising a mounting section arranged to be connected to the rotary drive member so as to be rotatable therewith, a bevel cutting section connected to the mounting section so as to be rotatable therewith and comprising a bevel member having an axis of rotation adapted to be located in an operating position to bevel the pipe end edge portion, said bevel cutting section having a locating surface portion rotatable with said bevel section, and located adjacent to said bevel member in its operating position to engage the pipe end edge portion to locate said bevel section wherein said bevel cutting section comprises a locating member having an end edge portion which comprises said locating surface portion which extends around the bevel member, said bevel member and said locating member are adjustably movable relative to one another along said axis of rotation of said bevel member and said locating member comprises a side wall which defines a recess in which to receive said bevel member.

2. The assembly as recited in claim 1, wherein said locating member is adjustably mounted to said mounting section, so as to be able to be positioned at different locations along the axis of rotation of the bevel member by repositioning a connecting member that is connected to the bevel member to the mounting section.

3. The assembly as recited in claim 2, wherein said locating member threadedly engages said mounting section.

4. The assembly as recited in claim 3, wherein said bevel member connects to said mounting section, so that the relative locations of the bevel member and the locating member can be modified by adjustably moving said locating member relative to said mounting section.

5. The assembly as recited in claim 3, wherein said bevel member has a threaded connecting portion which connects to a threaded socket in said drive member.

6. The assembly as recited in claim 1, wherein said mounting section has a collet connecting portion to engage said bevel member.

7. The assembly as recited in claim 1, wherein said bevel member has a slanting cone-shaped cutting surface, having a larger diameter base end portion and a apex end portion, said bevel member having adjacent its apex end a lateral positioning member which has a surrounding positioning surface to engage a side wall of a pipe on which a beveling operation is being performed.

8. The assembly as recited in claim 7, wherein said assembly comprises a locating member which provides said locating surface portion which extends circumferentially around said locating member, said locating member being movably adjustable along an axis of rotation of said mounting section and said bevel member by repositioning a connecting member that is connected to the bevel member to the mounting section.

9. The assembly as recited in claim 8, wherein said locating member is adjustably mounted to said mounting section, so as to be able to be positioned at different locations along the axis of rotation of the bevel member.

10. The assembly as recited in claim 9, wherein said locating member threadedly engages said mounting member.

11. The assembly as recited in claim 7, wherein said lateral positioning member has a surrounding rotatable bearing on which is the positioning surface.

12. The assembly as recited in claim 1, wherein said bevel section comprises:
   a) said mounting section comprising a threaded end connection adapted to engage said rotary drive-member so as to be rotatable therewith, an intermediate threaded portion having a first end connected to said threaded end connector, and a bevel end connecting portion connected to said intermediate threaded end portion;
   b) said bevel cutting section comprising:
      said bevel member having a bevel connecting member portion arranged to be connected to the bevel end connecting portion of the mounting section, a locating member having an end edge portion which provides said locating surface portion, said locating member having a threaded connecting portion arranged to threadedly engage said intermediate threaded portion of the mounting section so as to be adjustably movable relative thereto, said locating member also having a recess in which to receive said bevel member,
      said bevel member having a slanted cone-shaped cutting surface having a base end portion and said apex end portion, a lateral positioning member which is located adjacent an apex end of said bevel member, said lateral positioning member having a surrounding positioning surface to engage a sidewall of a pipe on which a beveling operation is to be performed.

13. A method of beveling an end edge portion of a pipe, said method comprising:
   a) providing a rotary power saw wherein said rotary power saw section comprises:
      i) a rear handle grip portion which is adapted to be manually grasped,
      ii) a forward saw portion having a saw mounting portion with a rotary drive member to which a rotary saw blade can be mounted, said rotary drive member having a transverse axis of rotation about a center axis of rotation of the rotary drive member;
   b) providing a bevel section comprising a mounting section and a bevel cutting section connected to said mounting section, with said bevel cutting section having a locating surface and a bevel member wherein said bevel cutting section comprises a locating member having an end edge portion which comprises said locating surface portion which extends around the axis of rotation of said bevel member, said bevel member and said locating member are adjustably movable relative to one another along said axis of rotation of said bevel member and said locating member comprises a side wall which defines a recess in which to receive said bevel member;
   c) connecting said mounting section to said rotary drive member so that said mounting section and said bevel cutting section with said bevel member and said locating surface rotate with said drive member;
   d) positioning said rotary power saw so that said bevel member is adjacent to the end edge portion of the pipe and said locating surface is positioned against said end edge portion of the pipe;
   e) operating said rotary power saw to rotate said drive member and thus rotate said bevel member;
   f) moving said rotary power saw so that said bevel section moves around the end edge portion of the pipe to form a bevel surface with the locating surface portion engaging the end edge portion to properly locate the bevel member.

14. The method as recited in claim 13, wherein said locating member threadedly engages said mounting member, said method further comprising rotating said locating member to adjust the position of the locating member.

15. The method as recited in claim 13, wherein lateral positioning of said bevel member is controlled by providing a lateral positioning member having a surrounding positioning surface to engage a sidewall of said pipe, and locating said lateral positioning member at an apex end portion of said bevel member.

16. A bevel apparatus adapted to be connected to a drive member to perform a beveling operation, said bevel apparatus comprises:
   a) a mounting section having:
      i) a threaded end connection adapted to engage a rotary drive member so as to be rotatable therewith;
      ii) an intermediate portion having a first end connected to said threaded end connector;
      iii) a bevel end connecting portion connected to said intermediate threaded end portion;
   b) a bevel cutting section comprising:
      i) a bevel member having a bevel connecting member portion arranged to be connected to the bevel end connecting portion of the mounting section;
      ii) a locating member having an end edge portion which provides a locating surface portion, said locating member having a connecting portion arranged to engage said intermediate portion of the mounting section so as to be adjustably movable relative thereto, said locating member also having a recess in which to receive said bevel member;
      iii) the bevel member having a slanted cone-shaped cutting surface having a base end portion and an apex end portion;
      iv) a lateral positioning member which is located adjacent the apex end of said lateral positioning member having a surrounding positioning surface to engage a sidewall of a pipe on which a beveling operation is to be performed.

17. A bevel apparatus adapted to be connected to a drive member to perform a beveling operation, said bevel apparatus comprises:
   a) a mounting section having:
      i) a threaded end connection adapted to engage a rotary drive member so as to be rotatable therewith;
      ii) an intermediate portion adjacent to said threaded end connector;
      iii) a bevel end connecting portion connected to said intermediate portion;
   b) a bevel cutting section comprising:
      i) a bevel member having a bevel connecting member portion arranged to be connected to the bevel end connecting portion of the mounting section;

ii) a locating member having an end edge portion which provides a locating surface portion, said locating member having a connecting portion arranged to engage the mounting section so as to be adjustably movable relative thereto, said locating member also having a recess in which to receive said bevel member;

iii) the bevel member having a slanted cone-shaped cutting surface having a base end portion and an apex end portion;

iv) a lateral positioning member which is located adjacent the apex end of said lateral positioning member having a surrounding positioning surface to engage a cylindrical wall portion of a pipe on which a beveling operation is to be performed;

c) whereas the locating member is adapted to reposition with respect to the mounting section to adjust the relative position of bevel member extending beyond the locating surface.

18. A bevel apparatus as recited in claim 17, wherein said bevel member and said locating member are adjustably movable relative to one another along an axis of rotation of said bevel member.

19. A bevel apparatus as recited in claim 18, wherein said locating member comprises a side wall which defines a recess, in which to receive said bevel member.

20. A bevel apparatus as recited in claim 17, wherein said locating member is adjustably mounted to said mounting section, so as to be able to be positioned at different locations along the axis of rotation of the bevel member.

21. A bevel apparatus as recited in claim 20, wherein said locating member threadedly engages said mounting member.

22. A bevel apparatus as recited in claim 21, wherein said bevel member connects to said mounting section, so that the relative locations of the bevel member and the locating member can be modified by adjustably moving said locating member relative to said mounting section.

23. A bevel apparatus as recited in claim 17, wherein said mounting section has a collet connecting portion to engage said bevel member.

24. A pipe beveler for beveling an outer circumferential side surface adjacent to a transverse edge surface of a pipe, the pipe beveler adapted to be mounted to a rotary power device having a rotary drive member, the pipe beveler comprising:

a mounting section having an end connector adapted to be fixedly and removably attached to the rotary drive member, a bevel cutting section having a bevel member that is adapted to bevel the outer circumferential side surface of a pipe, a locating member having a locating surface which extends substantially around the axis of rotation of said bevel member that is adapted to engage the transverse edge portion of a pipe where the locating surface properly positions the bevel member to remove a predetermined amount of material from the pipe, said locating member comprises a side wall which defines a recess in which to receive said bevel member, an adjustment system adapted to position the locating member with respect to the mounting section whereby the locating surface is adjusted with respect to the bevel member to remove a determined amount of material from the outer circumferential side surface of the pipe.

25. The apparatus as recited in claim 24 whereby the mounting section comprises a flat side portion that is adapted to receive a turning device for removing and attaching the pipe beveler to the rotary power device.

26. The apparatus as recited in claim 25 whereby the rotary power device is a rotary power saw.

27. The pipe beveler as recited in claim 26 whereby the bevel member is connected by a threaded engagement and a lock nut is adapted to engage a forward surface of the mounting section.

28. The pipe beveler as recited in claim 27 whereby a surface defining an opening of the locating member provides access to the lock nut.

29. The pipe beveler as recited in claim 24 whereby the bevel member is connected by a collet where a surface defining a side open portion of the locating member provides access to the collet.

30. The pipe beveler as recited in claim 24 whereby a roller is attached to a forward portion of the bevel member and is adapted to engage the outer circumferential side surface of the pipe to aid in properly positioning the pipe beveler with respect to the pipe.

* * * * *